United States Patent
Roper, Jr.

(10) Patent No.: US 7,144,362 B2
(45) Date of Patent: Dec. 5, 2006

(54) METHOD FOR CHEMICALLY STABILIZING WASTE MATERIALS CONTAINING MULTIVALENT OXYANIONS

(75) Inventor: Ralph E. Roper, Jr., Carmel, IN (US)

(73) Assignee: Heritage Environmental Servicers, LLC, Indianapolis, IN (US)

( * ) Notice: Subject to any disclaimer, the term of this patent is extended or adjusted under 35 U.S.C. 154(b) by 1 day.

(21) Appl. No.: 10/977,826

(22) Filed: Oct. 29, 2004

(65) Prior Publication Data

US 2006/0094921 A1    May 4, 2006

(51) Int. Cl.
B09B 1/00    (2006.01)

(52) U.S. Cl. .................... 588/257; 588/409

(58) Field of Classification Search ......... 588/409, 588/256, 257
See application file for complete search history.

(56) References Cited

U.S. PATENT DOCUMENTS

| | | | |
|---|---|---|---|
| 3,130,012 A | 4/1964 | Prater | |
| 3,914,375 A | 10/1975 | Clark | |
| 3,933,635 A | 1/1976 | Marchant | |
| 3,959,097 A | 5/1976 | Queneau | |
| 3,981,965 A | 9/1976 | Gancy | |
| 4,026,797 A | 5/1977 | Nikolic | |
| 4,113,504 A * | 9/1978 | Chen et al. ................ | 588/3 |
| 4,222,999 A | 9/1980 | Weir | |
| 4,330,508 A | 5/1982 | Weir | |
| 4,405,464 A | 9/1983 | Baldwin | |
| 4,458,030 A | 7/1984 | Manabe | |
| 4,519,913 A | 5/1985 | Baldwin | |
| 4,544,541 A | 10/1985 | Chou | |
| 4,678,584 A | 7/1987 | Elfline | |
| 4,725,357 A | 2/1988 | Downing | |
| 4,752,397 A | 6/1988 | Sood | |
| 4,806,264 A | 2/1989 | Murphy | |
| 4,910,010 A | 3/1990 | Khalafalla | |
| 4,935,146 A | 6/1990 | O'Neil | |
| 4,940,549 A | 7/1990 | Olsen | |
| 5,071,568 A | 12/1991 | Bennett | |
| 5,089,141 A | 2/1992 | Murphy | |
| 5,200,082 A | 4/1993 | Olsen | |
| 5,264,133 A | 11/1993 | Forschner | |
| 5,322,600 A | 6/1994 | Spitz | |
| 5,416,252 A * | 5/1995 | Sorrentino et al. ......... | 588/257 |
| 5,453,201 A | 9/1995 | Etzel | |
| 5,547,588 A * | 8/1996 | Hassett et al. ............. | 210/724 |
| 5,603,838 A | 2/1997 | Misra | |
| 5,810,920 A * | 9/1998 | Ueshima et al. ........... | 588/318 |

(Continued)

FOREIGN PATENT DOCUMENTS

| | | | |
|---|---|---|---|
| JP | 52082850 A | * | 7/1977 |
| JP | 56095399 A | * | 8/1981 |
| JP | 2002254049 A | * | 9/2002 |

OTHER PUBLICATIONS

Federal Register, vol. 69, No. 28, pp. 6567-6575, Feb. 11, 2004.

(Continued)

Primary Examiner—John Kreck
(74) Attorney, Agent, or Firm—Butzel Long (57) ABSTRACT

A method of chemically stabilizing multivalent oxyanions in residue materials such as wastes from glass manufacturing facilities which method involves adding to the residue material cement, lime and aluminum sulfate to form a clay-like material having a low leachability and permeability to water. Calcium polysulfide or other sulfide bearing materials can also be added to assist in stabilizing multivalent oxyanions by adjusting the oxidation-reduction potential of the stabilized waste matrix.

7 Claims, 4 Drawing Sheets

U.S. PATENT DOCUMENTS

| | | |
|---|---|---|
| 5,993,667 A | 11/1999 | Overman |
| 6,090,290 A | 7/2000 | Goodman |
| 6,235,204 B1 | 5/2001 | Castaldi |
| 2001/0046419 A1* | 11/2001 | Taki et al. ............... 405/263 |
| 2003/0165359 A1* | 9/2003 | Chowdhury et al. ..... 405/128.5 |
| 2004/0018130 A1* | 1/2004 | Forrester ................. 422/261 |

OTHER PUBLICATIONS

Federal Register, vol. 63, No. 205, pp. 56886-56891, Oct. 23, 1998.

Baur, et al, Sorption of Selenite and Selenate to Cement Minerals, Environ. Sci. Technol. 2003, vol. 37, No. 15, pp. 3442-3447.

Zhang, et al, Removal of B, Cr, Mo, and Se from Wastewater by Incorporation into Hydrocalumite and Ettringite, Environ. Sci. Technol. 2003, vol. 37, No. 13, pp. 2937-2952.

Klemm, Ettringite and Oxyanion-Substituted Ettringites, Research and Development Bulletin RD116W, Portland Cement Association, 1998.

* cited by examiner

METHOD FOR CHEMICALLY STABILIZING WASTE MATERIALS CONTAINING MULTIVALENT OXYANIONS

TECHNICAL FIELD

The present invention relates to a method for chemically stabilizing multivalent oxyanions such as selenium, chrome, boron, arsenic and molybdenum. More particularly, the present invention relates to a method for chemically stabilizing multivalent oxyanions such as selenium, chrome, boron, arsenic and molybdenum in residues in order to reduce the potential for leachability in water.

BACKGROUND ART

Under the Resource Conservation and Recovery Act (RCRA), the US Environmental Protection Agency (EPA) is required to set levels of treatment which substantially reduce the toxicity of hazardous wastes or substantially reduce the likelihood of migration of hazardous constituents from wastes. The current treatment standard for wastes exhibiting the toxicity characteristic for selenium is based upon the performance of stabilization treatment technology. EPA's performance criterion for the stabilization of a selenium characteristically hazardous waste was developed in 1990 (Rosengrant et al., EPA 530-SW-90-059A, May, 1990) using a mineral processing waste determined at that time to be the most difficult to treat selenium waste. The untreated waste upon which the criterion was based contained only 700 ppm (0.07%) total selenium and yielded an untreated TCLP (toxicity characteristic leaching procedure) leachate concentration of 3.74 mg/L. The resulting post-treatment level of selenium led to establishment of a national treatment TCLP standard of 5.7 mg/L for selenium-bearing wastes.

It subsequently became apparent to the EPA that selenium bearing wastes generated by the glass manufacturing industry frequently contained selenium concentrations much higher than those EPA had examined when it established the national treatment standard for selenium. In some cases, for example, the total selenium concentrations range from 10,000 ppm to over 80,000 ppm (or 1% to over 8%). Based upon the high levels of selenium in glass manufacturing wastes and the inability to treat the wastes to be in compliance with the national treatment TCLP standard of 5.7 mg/L for selenium-bearing wastes, petitions were submitted to the EPA requesting site-specific variances for stabilization of selenium wastes from glass manufactures.

Based on test results for alternative stabilization methods submitted by an initial petitioner, the EPA concluded that the best demonstrated available technology (referred to as BDAT-1) for stabilizing the selenium wastes involved combining wastes with a mix of cement and ferrous sulfate (FR Oct. 23, 1998). Typical reagent-to-waste ratios for this treatment protocol were 2.0:1 cement and 0.7:1 ferrous sulfate resulting in an overall reagent-to-waste ratio of 2.7 to 1. The addition of ferrous sulfate was primarily for the purpose of serving as a reducing reagent for stabilizing hexavalent chrome when present in the waste material.

Supplemental testing results submitted by a second petitioner (FR Feb. 11, 2004) enabled the EPA to establish an improved BDAT stabilization method for high-selenium wastes which involved adding a mix of cement, cement kiln dust and ferrous sulfate to waste materials. Typical dose rates for this improved technology were 1.0 part cement, 1.0 part cement kiln dust and 0.35 parts ferrous sulfate heptahydrate per part of waste with an overall reagent-to-waste ratio of 2.35.

When using these formulations water is typically added to make a thick paste that upon curing solidifies the treated material into a hard cementitious material. The EPA granted site specific variances for application of these technologies to selenium bearing wastes from three glass manufactures (FR Feb. 11, 2004). Depending on the facility, the variances ranged from TLCP selenium concentrations of 25 mg/l to 51 mg/l.

Several technologies are available for removing multivalent oxyanions from water or wastewater. Perhaps the most widely used method is co-precipitation with ferric hydroxide or aluminum hydroxide as discussed in the textbook "Water Treatment Principles & Design" (James M. Montgomery, Consulting Engineers, Inc., John Wiley & Sons, New York (1985)). Iron co-precipitation and aluminum co-precipitation methods are generally most effective at pHs of 7 or lower and are sensitive to the valence of the particular multivalent oxyanion. Iron or aluminum co-precipitation is effective for arsenate and selenite, but not for arsenite and selenate.

A number of patents are directed to "cementation" techniques that involve chemical reduction of specific oxyanions to their insoluble elemental form by oxidation of a metal that is added in its metallic form. For example, U.S. Pat. No. 3,933,635 to Marchant discloses the use of metallic zinc, iron or aluminum at an acidic pH to chemically reduce selenium ions to elemental selenium. The method can be used to remove selenium from zinc smelter acidic wastewater by treating the wastewater with metallic zinc.

Certain bacteria can also be used to chemically reduce multivalent oxyanions. For example, U.S. Pat. No. 4,519,913 to Baldwin et al. discloses the use of an anaerobic bacteria of the genus *Clostridium* for the biochemical reduction of selenium ions to insoluble metallic selenium.

U.S. Pat. No. 4,806,264 to Murphy discloses another technique in which ferrous iron is added to a wastewater at a pH of about 9 to chemically reduce selenate and selenite to elemental selenium.

Removal of multivalent oxyanions by applications of ion exchange and electrowinning technologies have also been developed as exemplified in U.S. Pat. No. 5,453,201 to Etzel et al. and U.S. Pat. No. 5,322,600 to Spitz et al.

Several patents are directed to techniques that remove oxyanions from water using activated or calcined hydrotalcite. For example, U.S. Pat. No. 4,458,030 to Manabe discloses the use of calcined magnesium or zinc hydrotalcite blended with activated carbon to effect an apparent synergistic effect for removing specific organic compounds and chromate and arsenate. U.S. Pat. No. 4,752,396 to Sood discloses an adsorbent for metal removal that consists of from 20 to 100 wt. % activated hydrotalcite and a balance of activated alumina. U.S. Pat. No. 4,935,146 to O'neill et al. discloses the use of calcined hydrotalcite at alkaline pHs to remove selenate, selenite and arsenite from water or wastewater.

It was concluded from laboratory testing and/or cost considerations that none of these water and wastewater treatment techniques were workable and/or practical for adaptation to the stabilization of residues containing multivalent oxyanions. Moreover, because stabilization with portland cement was moderately effective and had already been cited by the EPA as the best demonstrated technology for stabilizing selenium bearing residues generated by several glass manufacturers, subsequent research was directed towards enhancing the performance of portland cement as a stabilization reagent by the addition of supplemental reagents while maintaining an alkaline, pH.

Klemm ("Ettringite and Oxyanion-Substituted Ettringites", *Research and Development Bulletin RD116W*, Portland Cement Association, 1998) provides an in-depth review and analysis of published literature as it relates to the stabilization of multivalent oxyanions through the formation of ettringite. Klemm's objective was to provide a foundation of knowledge upon which portland cement can be adapted to optimize ettringite's metals fixation characteristics. Some of the key conclusions were as follows.

The designation ettringite is most commonly thought of in terms of the calcium trisulfoaluminate hydrate, designated as:

$$Ca_6Al_2(OH)_{12}(SO_4)_3 \cdot 26H_2O$$

During the initial stage of portland cement hydration, tricalcium aluminate reacts with calcium sulfate (gypsum) to immediately form ettringite:

$$Ca_3Al_2O_6 + 3CaSO_4 \cdot 2H_2O + 26H_2O \rightarrow Ca_6Al_2(OH)_{12}(SO_4)_3 \cdot 26H_2O \quad (1)$$

However, the limited amount of gypsum relative to the amount of aluminate results in a second step reaction in which much of the ettringite is converted into calcium monosulfoaluminate:

$$Ca_6Al_2(OH)_{12}(SO_4)_3 \cdot 26H_2O + 2Ca_3Al_2O_6 + 4H_2O \rightarrow 3Ca_4Al_2(OH)_{12}(SO_4) \cdot 6H_2O \quad (2)$$

Ettringite has a much lower solubility than calcium monosulfate and thus appears to be most stable.

The composition of the ettringite that forms in cement is very different from the pure mineral phase. For example, calcium can be substituted by strontium and aluminum can be substituted by other trivalent metals such as trivalent chrome. Oxyanion species including selenate, selenite, borate, sulfite, arsenate and chromate can be incorporated into the structure of ettringite at high pH levels by substitution for sulfate in the ettringite.

A major advantage of ettringite-based chemistry, as applied to the stabilization of residues, is the extremely low solubility of ettringite at alkaline pHs in the range of 10.4 to 13.7, thereby providing a strong resistance to leaching.

It has long been recognized that ettringite can be easily prepared from mixtures of lime and aluminum sulfate, and that the reaction occurs very quickly, generally within an hour.

Tests were reported by others that showed that significant ettringite can form in pastes made from various high-calcium coal combustion fly ashes and residues which showed a positive correlation between the amount of ettringite formed and the resistance to selenium and boron leaching.

Zhang et al. ("Removal of B, Cr, Mo, and Se from Wastewater by Incorporation into Hydrocalumite and Ettringite," *Environ. Sci. Technol.*, 2003, Vol. 37, No. 13, pp 2947–2952) reported on the removal of various multivalent oxyanions from wastewater by incorporation into ettringite or hydrocalumite. The tests were performed by directly precipitating ettringite or hydrocalumite from solutions containing selenate, borate, chromate and molybdate. The ettringite was precipitated by adding hydrated lime and aluminum sulfate in accordance with the following reaction:

$$6Ca(OH)_2 + Al_2(SO_4)_3 + 26H_2O \rightarrow Ca_6Al_2(OH)_{12}(SO_4)_3 \cdot 26H_2O \quad (3)$$

In a separate test, hydrocalumite was precipitated by adding hydrated lime and monocalcium aluminate in accordance with the following reaction:

$$3Ca(OH)_2 + CaAl_2O_4 + 10H_2O \rightarrow Ca_4Al_2(OH)_{12}(OH)_2 \cdot 6H_2O \quad (4)$$

Excess lime was added in both cases to ensure the solutions were highly alkaline. X-ray diffraction (XRD) testing was performed to verify that the principal solid phases were indeed ettringite and hydrocalumite for the respective tests. The XRD patterns showed that ettringite formation was nearly complete after only 1 day of reaction, whereas formation of hydrocalumite took between 7 and 30 days to fully develop. The tests indicated that ettringite and hydrocalumite are both capable of greatly reducing the concentrations of borate, chromate, molybdate and selenate from solutions. Removals by ettringite showed a preference in the order of borate>selenate>chromate>molybdate with equilibrium concentrations (at pH around 12.5) of about <0.08 mg/L B, 2 mg/L Se, 4 mg/L Cr and 5 mg/L Mo. A review of the technical literature indicated that direct substitution for sulfate is likely the dominant mechanism for uptake of oxyanions by ettringite. The investigators pointed out that both ettringite and hydrocalumite are unstable at low pH and that pH values greater than 10.7 are required for ettringite and pH values greater than 11.6 are required for hydrocalumite.

Bauer et al. ("Sorption of Selenite and Selenate to Cement Materials," *Environ. Sci. Technol.*, 2003, Vol. 37, No. 15, pp 3442–3447) recently conducted experiments on the sorption of selenite and selenate to ettringite solids (calcium trisulfoaluminate) and "monosulfate" (calcium monosulfoaluminate). The protocol was considerably different from that used by Zhang et al. in that preformed ettringite and monosulfate solids were used that had equilibrated for over seven days before contacting the selenite and selenate. These results suggest that substitution of selenium oxyanions for sulfate is more difficult with preformed ettringite or monosulfate.

Although the previously described technologies acknowledged by the EPA for selenium stabilization are currently viewed as the best available, the TCLP selenium concentrations that could be reliably achieved by them remain much higher than the original 5.7 mg/L TCLP criterion. The present invention provides a superior stabilization technology for selenium-bearing wastes that more closely approaches the original TCLP selenium criterion.

DISCLOSURE OF THE INVENTION

According to various features, characteristics and embodiments of the present invention which will become apparent as the description thereof proceeds, the present invention provides a method for chemically stabilizing selenium or other multivalent oxyanions in materials that have a significant potential for leaching such oxyanions into groundwater.

The method involves providing a residue material containing at least one multivalent oxyanion and adding to the residue material cement, lime and aluminum sulfate to form a clay-like material having a low permeability to water that is suitable for landfill disposal. The cement, lime and aluminum sulfate can be added sequentially or simultaneously. Water can be added to form a non-dusty slurry that can be mixed into a homogeneous consistency, to which liquid alum or aluminum sulfate salt can be added to convert the slurry into clay-like material containing no free liquid.

The cement can be provided as various types or derivatives of portland cement or wastes containing cement, including cement kiln dust. The lime can be provided as any of suitable type or purity of hydrated lime, quicklime, lime kiln dusts, waste materials containing lime, and other alkaline reagents or combination of reagents that provide calcium and/or alkalinity to the stabilized residue matrix. The aluminum sulfate can be added as a dry material, a hydrated material, liquid alum, or a combination of reagents or waste materials that provide aluminum and/or sulfate to the stabilized residue matrix.

In addition to the cement, lime and aluminum sulfate, calcium polysulfide or other sulfide bearing materials can be added to assist in stabilizing multivalent oxyanions such as chrome by adjusting the oxidation-reduction potential of the stabilized residue matrix.

The method can be used to stabilize various multivalent oxyanions and for environmental purposes, is particularly useful for chemically stabilizing selenium, boron, chromium, molybdenum, arsenic, and/or antimony.

BRIEF DESCRIPTION OF DRAWINGS

The present invention will be described with reference to the attached drawings which are given as non-limiting examples only, in which.

BEST MODE FOR CARRYING OUT THE INVENTION

The present invention relates to a process for chemically stabilizing multivalent oxyanions such as selenium, chrome, boron, arsenic and molybdenum in residues in order to reduce the potential for leachability in water.

During the course of the present invention, it was discovered that stabilization of multivalent oxyanions based upon the use of cement can be dramatically improved when the cement is supplemented with aluminum sulfate and lime. In the case of selenium, laboratory testing and subsequent field testing demonstrated that wastes having total selenium concentrations of up to 85,000 ppm or untreated TCLP selenium concentrations of over 600 mg/l were reliably stabilized by the method of the present invention with TCLP selenium results routinely less than 10 mg/l.

The treatment method of the present invention can be incorporated in batch or continuous processes for chemically stabilizing selenium and/or other multivalent oxyanions such as boron, chrome, molybdenum and arsenic in residues to reduce the potential for leachability in water. A particular application of the method is in the stabilization of selenium present in hazardous wastes generated by the glass manufacturing industry.

The method of the present invention involves adding cement, lime and aluminum sulfate to the waste materials. As a result, highly insoluble compounds containing multivalent oxyanions are formed which effect stabilization of the multivalent oxyanions. During the course of the present invention, the inventor determined that the nature of the chemical stabilization process is dependent on the valence of target oxyanions and involves direct substitution of oxyanions for sulfate along with surface adsorption within an alkaline matrix of calcium sulfoaluminate compounds such as ettringite.

Although the present invention is directed to a method of stabilizing all types of multivalent oxyanions including selenium, chrome, arsenic, molybdenum, boron, antimony and others that are of environmental concern, for purposes of describing the present invention, detailed reference is presented for the stabilization of selenium, it being understood that the present invention is not limited to the stabilization of selenium.

The method of the present invention involves adding cement, lime and aluminum sulfate to waste materials containing selenium, chrome, arsenic, molybdenum, etc. to form a clay-like composition having a low leachability and permeability to water that is suitable for landfill disposal. The addition of the cement, lime and aluminum can be conducted sequentially in any order or simultaneously as desired.

Figure 1:
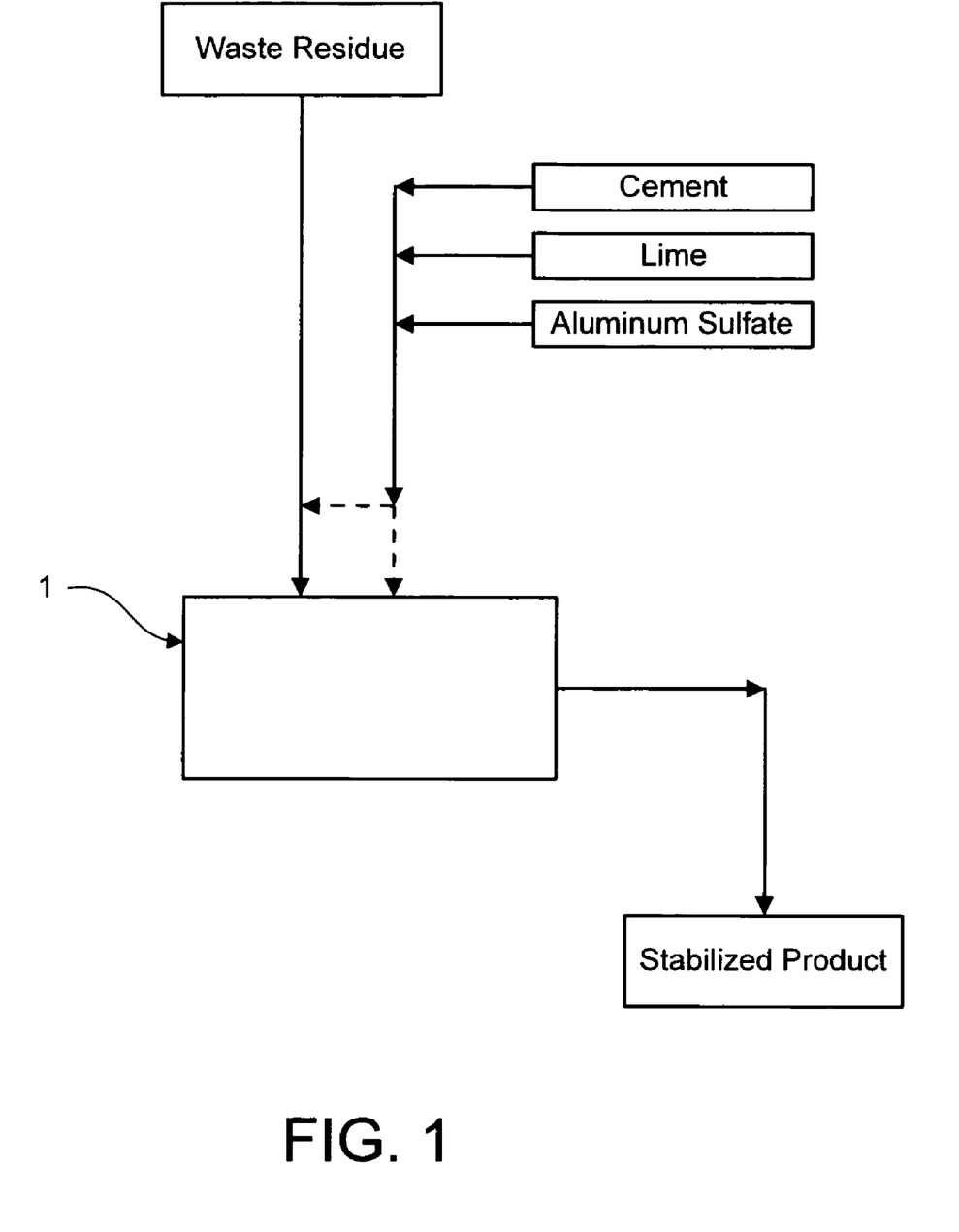
FIG. 1 is a flowchart depicting one manner of adding reagents to a waste residue according to one embodiment of the present invention.
Figure 2:
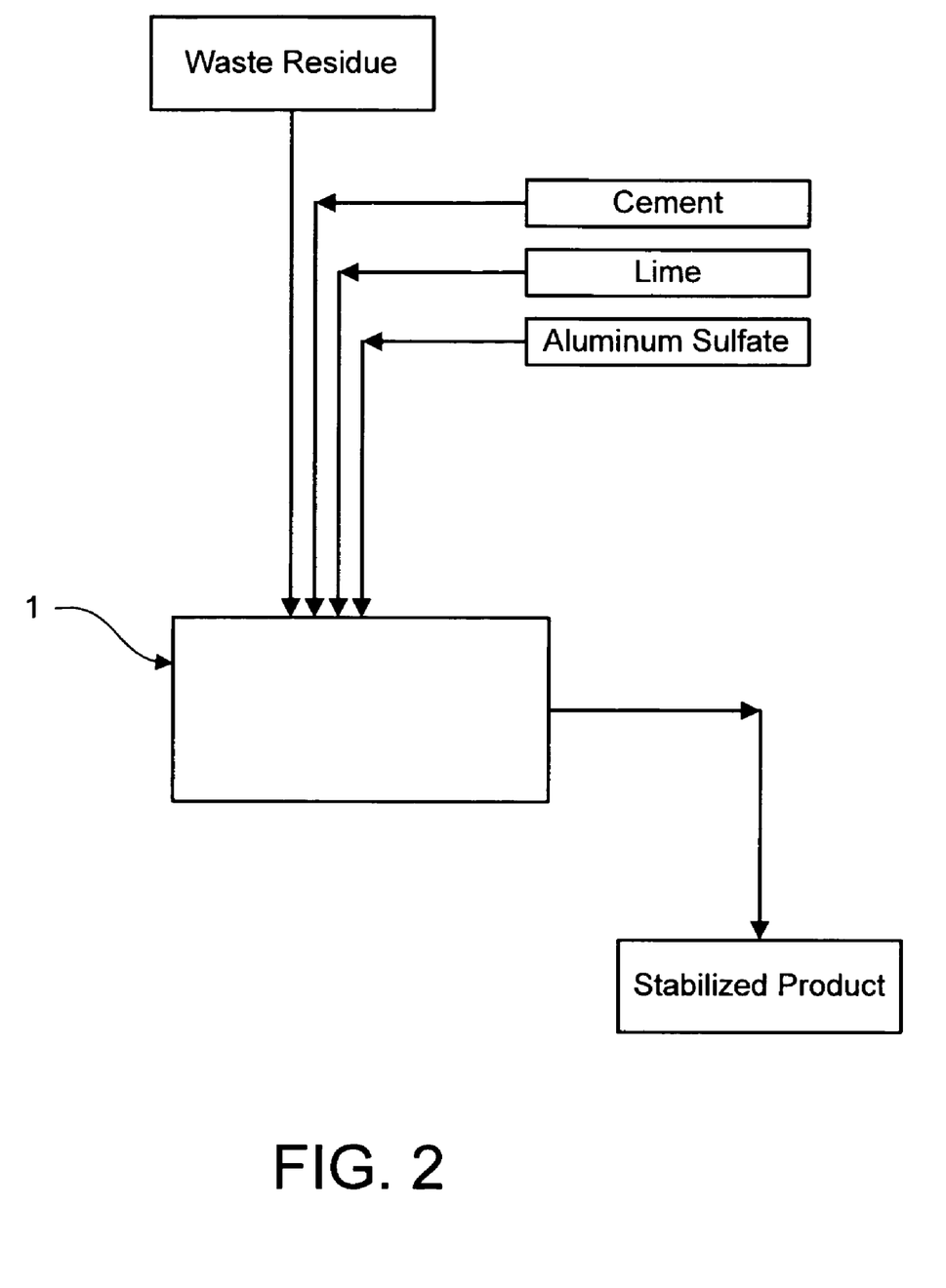
FIG. 2 a flowchart depicting one manner of adding reagents to a waste residue according to another embodiment of the present invention.

FIG. 1 is a flowchart depicting one manner of adding reagents to a waste residue according to one embodiment of the present invention. FIG. 2 is a flowchart depicting one manner of adding reagents to a waste residue according to another embodiment of the present invention.

In FIG. 1 the cement, lime and aluminum sulfate are depicted as being added to the residue simultaneously before or during thorough mixing in mixer 1. In FIG. 2 the cement, lime and aluminum sulfate are depicted as being added sequentially to the waste residue before or during thorough mixing in mixer 1.

According to one embodiment, the reagents are added along with enough water to form a slurry or paste that can be easily mixed to a homogeneous consistency. After mixing, aluminum sulfate in liquid or dry form can be added to convert the slurry of solids into a clay-like material with no free liquid. In the case of selenium, the nature of the chemical stabilization process is most likely a direct substitution of selenate for sulfate along with surface adsorption of selenite within a matrix of calcium sulfoaluminate compounds such as ettringite.

Figure 3:
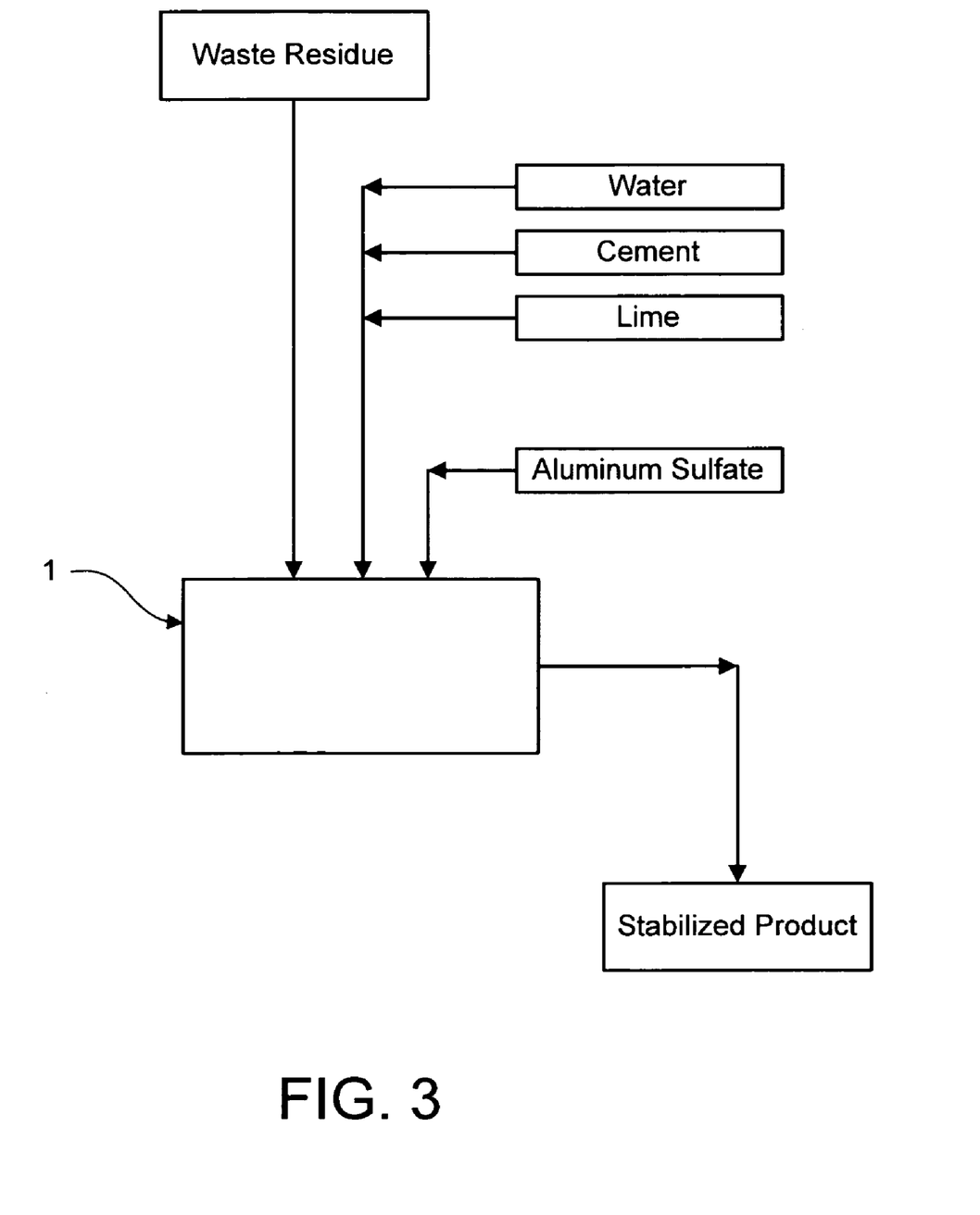
FIG. 3 is a flowchart depicting an alternative process of stabilizing waste residue according to the present invention.

FIG. 3 is a flowchart depicting an alternative process of stabilizing waste residue according to the present invention. In FIG. 3 the cement and lime are depicted as being added to the residue along with water sequentially in any order or simultaneously before or during mixing in mixer 1 to from a slurry that can be easily mixed homogeneously. Aluminum sulfate is then added to remove free water from the resulting slurry mixture and form a clay-like material. It is noted that liquid alum or aluminum sulfate salt can be added to convert the slurry into clay-like material containing no free liquid.

The main reagents used in the process, i.e. the cement, lime and aluminum sulfate can be supplemented with the addition of calcium polysulfide or other sulfide bearing materials to assist in stabilizing other oxyanions such as chrome by adjusting the oxidation-reduction potential of the stabilized waste matrix. The process can be adapted for the stabilization of other materials containing other multivalent oxyanions such as those of boron, arsenic, chromium and molybdenum using a wide variety of alternative reagents or waste substitutes that contain the stabilization components of the key reagents.

Figure 4:
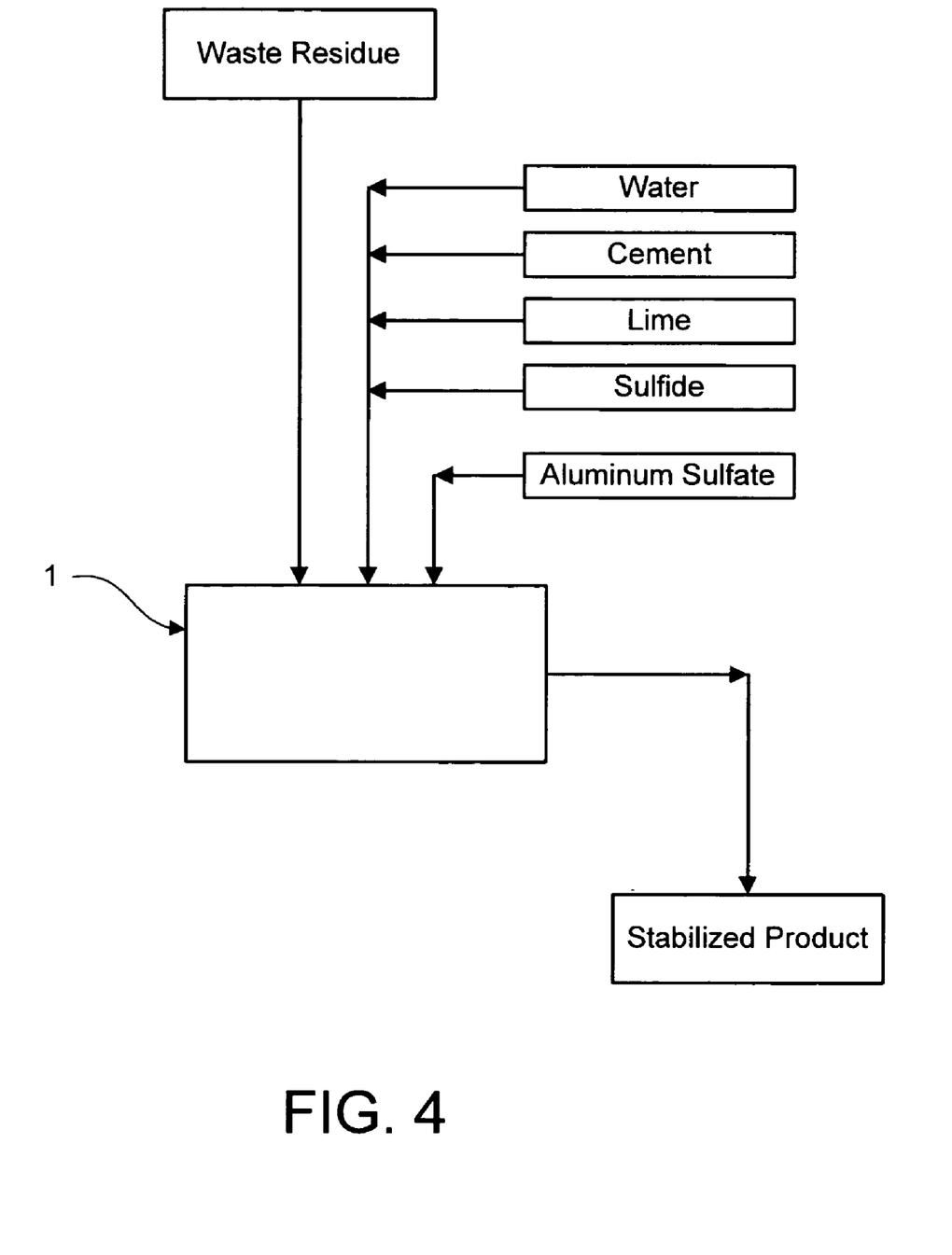
FIG. 4 is a flowchart depicting an alternative process for stabilizing different oxyanions according to one embodiment of the present invention.

FIG. 4 is a flowchart depicting an alternative process for stabilizing different oxyanions according to one embodiment of the present invention. In FIG. 4 reagents are added in the same manner as described in FIG. 3 above. In addition, a source of sulfide is added to assist in stabilizing other oxyanions such as chrome by adjusting the oxidation-reduction potential of the stabilized waste matrix.

During the course of the present invention, several series of stabilization tests were conducted on a selenium bearing residue generated by a glass manufacturer. The total selenium content for various samples ranged from less than 1 percent to over 8 percent. The percentage of selenium in the selenate, selenite and elemental forms was unknown.

The initial tests involved adding alum and lime in accordance with Eq. (3) above to make ettringite; and adding aluminum chlorhydrate and lime in accordance with Eq.(4) to make what was believed to be hydrocalumite.

Stabilization of the residue with portland cement was dramatically improved when the cement was supplemented with ettringite formed by the addition of lime and alum. The fact that the sulfate containing ettringite was a key component of the improved stabilization was verified by the results from a similar test in which the portland cement was supplemented with hydrocalumite by the addition of lime and aluminum chlorhydrate. The addition of hydrocalumite (which contains no sulfate) demonstrated no stabilization improvement over the use of cement alone, i.e., the TCLP selenium concentrations with and without hydrocalumite were both about 40 mg/L. On the other hand, the TCLP selenium concentration for the residue stabilized with a mixture of cement and the sulfate-containing ettringite was typically only about 6 mg/L. It was also apparent that a synergy existed between portland cement and supplemental ettringite because attempts to stabilize the residue with only lime and alum failed.

Features and characteristics of the present invention will be exemplified by the following examples which are provided as non-limiting examples only. In the examples and throughout percentages are by weight unless otherwise indicated or determined by context.

EXAMPLE 1

In this example five different samples of selenium bearing residue from the same glass manufacturer were tested using three different stabilization technologies. The first technology tested is referred to herein as BDAT-1 and used reagent-to-waste ratios of 2:1 cement plus 0.70:1 ferrous sulfate. These reagents were in accordance with the selenium stabilization technology upon which EPA granted the first site-specific selenium variance in 1998. The second technology tested is referred to as BDAT-2 and used reagent to residue ratios of 1:1 cement, 1:1 cement kiln dust, and 0.35:1 ferrous sulfate in accordance with the selenium stabilization technology upon which EPA granted a similar site-specific selenium variance in 2004. The third tested technology is the new technology invented by the present inventor and described herein. The third (or present) technology used reagent-to-residue ratios of 1:1 cement, 0.5:1 lime; 0.28:1 $Al_2(SO_4)_3$, and 0.017:1 calcium polysulfide ($CaS_x$). It is noted that the ferrous sulfate and calcium polysulfide reagents were added to reduce a small amount of chromate to the insoluble trivalent form.

Supplemental tests were also conducted in which an inert material was substituted for the BDAT-1 reagents (i.e., sand was added in place of the cement and ferrous sulfate) to verify that the stabilization results were not caused by simple dilution. The results from these tests are summarized in Table I below where it can be seen that the stabilized selenium concentrations for this newly developed technology averaged only 7.1 mg/L compared to 38 mg/L and 29 mg/L for the BDAT-1 and BDAT-2 technologies, respectively.

The results in Table I also show that adding inerts to the residue makes selenium more leachable. This was caused by the effect of dilution on lowering the resultant TCLP pH.

TABLE I

| Sample No. | Selenium Content (%) | Untreated Se waste TCLP | BDAT-1 treatment of Se waste TCLP | Treatment of Se waste with inert reagent TCLP | BDAT-2 treatment of Se waste TCLP | Method of Present Invention TCLP |
|---|---|---|---|---|---|---|
| 1 | 6.7% | 70 mg/L | 45 mg/L | 730 mg/L | 30 mg/L | 7.0 mg/L |
| 2 | 5.8% | 72 mg/L | 28 mg/L | 540 mg/L | 36 mg/L | 7.6 mg/L |
| 3 | 6.0% | 66 mg/L | 38 mg/L | 590 mg/L | 26 mg/L | —[1] |
| 4 | 7.2% | 120 mg/L | 40 mg/L | 740 mg/L | 27 mg/L | 6.9 mg/L |
| 5 | 6.3% | 68 mg/L | 38 mg/L | 600 mg/L | 28 mg/L | 6.8 mg/l |
| Averages | | 79 mg/L | 38 mg/L | 640 mg/L | 29 mg/L | 7.1 mg/L |

[1]Insufficient amount of Sample 3 was available for testing.

EXAMPLE 2

In this example comparative tests were conducted to establish that ettringite is a key constituent of the stabilization process. Three samples were tested each of which included cement and lime reagents. The resultant TCLP pHs were all about the same and all had similar aluminum:residue ratios. Only the sample used in Test B included sulfate which is necessary to produce ettringite. The TCLP selenium concentration for Test No. B was only 5.6 mg/L whereas TCLP selenium concentration for the test samples that did not include sulfate ranged from 18 mg/L to 39 mg/L. The results of this example are shown in Table II below.

TABLE II

| Test | Cement | Ca(OH)$_2$ | Al$_2$(SO$_4$)$_3$ | Al$_2$Cl(OH)$_5$ | Al:Residue[1] Ratio | TCLP pH | TCLP Se (mg/L) |
|---|---|---|---|---|---|---|---|
| A | 2:1 | 0.70:1 | none | none | 0.052 | 12.0 | 18.0 |
| B | 2:1 | 0.42:1 | 0.28:1 | none | 0.096 | 11.9 | 5.6 |
| C | 1:1 | 0.22:1 | none | 0.18 | 0.082 | 11.7 | 39.0 |

[1] Assumes the aluminum content of cement is 2.6%.

EXAMPLE 3

In this example comparative tests were conducted to establish that cement is a key constituent of the stabilization process. Two test samples were used, one which included cement and one which excluded cement. The results of this example are shown in Table III below. As can be seen, the test sample that excluded cement gave very poor selenium stabilization results, even though lime and aluminum sulfate were added.

TABLE III

| Test | Cement | Ca(OH)$_2$ | Al$_2$(SO$_4$)$_3$ | CaS$_x$ | TCLP Se (mg/L) |
|---|---|---|---|---|---|
| D | none | 0.48:1 | 0.28:1 | 0.017:1 | 59 mg/L |
| E | 1:1 | 0.50:1 | 0.28:1 | 0.017:1 | 5 mg/L |

EXAMPLE 4

In addition to being effective in the stabilization of multivalent oxyanions using residue samples with relatively high selenium contents (up to and exceeding 8.5% total selenium), the method of the present invention was also found to be very effective for stabilizing dilute selenium residues (sometimes referred to as "transition" wastes) from the same generator. In this example, a "transition" waste containing 0.08% selenium with an untreated TCLP selenium concentration of 3.3 mg/L was treated using the following reduced reagent-to-waste ratios: 0.50:1 cement, 0.25:1 lime, 0.14:1 Al$_2$(SO$_4$)$_3$, and 0.01:1 CaS$_x$. The resulting TCLP selenium and chrome concentrations were only 0.6 mg/d 0.02 mg/L, respectively. The resulting post-treatment LCLP selenium concentration of 0.6 mg/L is in contrast to the 5.7 mg/L national criterion the EPA adopted based on stabilization tests performed on a dilute residue containing about the same about of total selenium (0.07% vs. 0.08%).

EXAMPLE 5

In this example tests were conducted to assess how leachability was affected by cure time. Example test results are summarized in Table IV below for two tests in which the stabilized materials were tested for TCLP selenium and chrome after 0, 1, 3, 6 and 126 days of curing. It was found that the stabilized materials generally become less leachable (more stabilized) over time. It was noted that for these particular tests, the lime doses were slightly less than optimum and resulted in low initial TCLP pHs (zero days of cure time) of about 10. An interesting characteristic of this technology, however, was that the alkalinity of the stabilized material generally increased (as evidenced by the increase in TCLP pH) with increasing cure time. For this particular application, it was generally observed that improved stabilization results occurred when the stabilized materials had alkalinity contents sufficient to maintain the TCLP pH above 10. In other words, the TCLP results for selenium were low even for no cure time when excess alkalinity was added or available from the residue itself. This was as expected because ettringite formation is fast and stable when the pH is above about 10.

TABLE IV

| | TEST F | | | Test G | | |
|---|---|---|---|---|---|---|
| Cure Time | TCLP pH | TCLP Se (mg/L) | TCLP Cr (mg/L) | TCLP pH | TCLP Se (mg/L) | TCLP Cr (mg/L) |
| 0 days | 9.86 | 53.0 | 0.27 | 9.98 | 50.4 | 0.19 |
| 1 day | 10.30 | 7.0 | — | 10.57 | 11.7 | — |
| 3 days | 11.30 | 2.0 | — | 11.20 | 5.6 | — |
| 6 days | 11.73 | 4.7 | — | 11.54 | 4.4 | — |
| 126 days | 11.66 | 6.6 | 0.034 | 11.76 | 5.5 | 0.029 |

EXAMPLE 6

In this example the stabilization method of the present invention was evaluated using other types of leach testing. The particular sample used for these tests had a total selenium content of 7.7%. After stabilizing the sample (using cement, lime, aluminum sulfate and calcium polysulfide) a lysimeter test was performed using a 6-inch diameter clear plastic tube. The bottom was fitted with a filter drain assembly and the center part of the column was packed with the stabilized material. The remainder of the tube above the waste was filled with water. Because of the clay-like consistency of the stabilized material, no leachate formed even after several months of testing. It was concluded, therefore, that in addition to the chemical stability of the method, the process provided a material with excellent physical properties that would render the material virtually impermeable when placed in a secure landfill.

The stabilized material used for the lysimeter tests was also tested for leachability using different types of leaching fluids. The standard leach fluid use for all of the tests was the TCLP leach solution No. 2 with a pH of 2.88. Test results with TCLP leach solution No. 1 (contains less acetic acid than for solution No. 2) and with deionized water were also conducted to verify that stabilization results were virtually unaffected by the type of leach solution used. The results summarized in Table V verified that was the case.

TABLE V

| Test No. | Extraction Fluid | TCLP selenium | TCLP Chrome |
|---|---|---|---|
| 1a | TCLP #2 (pH 2.9) | 4.2 mg/L | 0.054 mg/L |
| 1b | TCLP #1 (pH 4.8) | 3.8 mg/L | 0.047 mg/L |
| 1c | Deionized water | 3.7 mg/L | 0.083 mg/L |

EXAMPLE 7

In this example several full-scale field demonstration tests were conducted that confirmed the method of the present invention is effective for stabilizing multivalent oxyanions. The tests were conducted on several truckloads of selenium bearing residue generated from a glass manufacturer. The residue was generally the same as that previously described by the examples for residues with relatively high selenium contents of up to 8.5%. Table VI summarizes the results from these full-scale field tests. As can be seen, the TCLP results for selenium ranged from only 4.8 mg/L to 8.0 mg/L which is far superior to all previous stabilization processes.

TABLE VI

| | Batch: | | |
|---|---|---|---|
| | 1 | 2 | 9 |
| | Date: | | |
| | Apr. 5, 2004 | Apr. 7, 2004 | Jun. 5, 2004 |
| Stabilization Recipes[1] | | | |
| Se bearing waste | 1.00 unit | 1.00 unit | 1.00 unit |
| cement | 1.01 units | 1.03 units | 0.99 units |
| $Al_2(SO_4)_3$ | 0.28 units | 0.28 units | 0.28 units |
| Lime waste | 0.64 units | 0.61 units | 0.49 units |
| CaSx | 0.02 units | 0.02 units | 0.02 units |
| Stabilization Results | | | |
| TCLP Se | 8.0 mg/L | 4.8 mg/L | 6.3 mg/L |
| TCLP Cr | 0.07 mg/L | 0.08 mg/L | 0.15 mg/L |

[1]Reagents are reported on a dry-weight basis

The results from the above examples clearly demonstrate the effectiveness of present method for chemically stabilizing multivalent oxyanion bearing residues, while at the same time producing a clay-like material with very low permeability to water.

The amount of reagents used to stabilize a particular waste residue will depend on several factors such as the specific multivalent oxyanion or group of oxyanions to be stabilized, the stabilization criteria to be achieved, the alkalinity content of the residue, etc. For the example residues discussed in the preceding examples that contained up to about 8% selenium, effective stabilization was achieved using total reagent to residue ratios of less than 2:1. For the example residue containing 0.08% selenium, effective stabilization was achieved using a much lower ratio of less that 1:1. From the range of these ratios which cover a wide range of selenium concentrations, those skilled in the art can easily adapt the process of the present invention to treat other concentrations of oxyanions.

The lime dose is generally added in proportion to the amount of aluminum sulfate according to the stoichiometry of Eq. (3) above for making ettringite. Supplemental lime can be added as needed to adjust the alkalinity of the waste residue so that the stabilized residue pH and the TCLP pH are both about 10 or higher.

In general, the relative or optimum amounts of cement and aluminum sulfate are about 1:1 cement and 0.28:1 aluminum sulfate for the particular examples cited herein. The amounts of cement and aluminum sulfate can be adjusted as desired for any particular waste residue.

Supplemental sulfide reagent can be added as necessary to control the oxidation-reduction potential and change the valence of target oxyanions such as chrome. For the examples cited herein, a workable dose of calcium polysulfide was about 0.02:1.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above or set forth in the attached claims.

What is claimed is:

1. A method for chemically stabilizing multivalent selenium oxyanions in a residue material which comprises:
    providing a residue material containing at least 1 wt. % selenium oxyanions; and
    adding to the residue material reagents to form a clay-like material having a TCLP leachability of selenium that is less than 10 mg/L that is suitable for landfill disposal, said reagents consisting essentially of portland cement, lime and aluminum sulfate.

2. A method for chemically stabilizing multivalent selenium oxyanions in a residue material according to claim 1, wherein the portland cement, lime and aluminum sulfate are added sequentially in any order.

3. A method for chemically stabilizing multivalent selenium oxyanions in a residue material according to claim 1, wherein the portland cement, lime and aluminum sulfate are added simultaneously.

4. A method for chemically stabilizing multivalent selenium oxyanions in a residue material according to claim 1, further comprising adding water along with the portland cement, lime and aluminum sulfate to form a non-dusty slurry and mixing the slurry to a homogeneous consistency.

5. A method for chemically stabilizing multivalent selenium oxyanions in a residue material according to claim 4, further comprising adding at least one of liquid alum or aluminum sulfate salt to the slurry to convert the slurry into clay-like material containing no free liquid.

6. A method for chemically stabilizing multivalent selenium oxyanions in a residue material according to claim 1, wherein the lime comprises at least one of hydrated lime, quicklime, or lime kiln dusts.

7. A method for chemically stabilizing multivalent selenium oxyanions in a residue material according to claim 1, wherein the aluminum sulfate is added as at least one of a dry material, a hydrated material, or as liquid alum.

* * * * *